United States Patent [19]
Fetzer

[11] Patent Number: 5,908,210
[45] Date of Patent: Jun. 1, 1999

[54] AUTOMATED FLANGE RETAINING CLAMP WITH REDUNDANT FASTENERS

[76] Inventor: Kelly Fetzer, 14515 Wunderlich, No. 1409, Houston, Tex. 77069

[21] Appl. No.: 08/790,847

[22] Filed: Feb. 3, 1997

[51] Int. Cl.$^6$ ..................................................... F16L 23/04
[52] U.S. Cl. ............................ 285/24; 285/367; 285/411; 220/320; 292/256.6
[58] Field of Search ............................... 285/920, 24, 27, 285/84, 85, 365, 366, 367, 406, 411; 292/256.6, 256.65; 220/581, 592, 320

[56] References Cited

U.S. PATENT DOCUMENTS

| | | | |
|---|---|---|---|
| 2,982,437 | 5/1961 | Wheatley | 220/324 |
| 3,144,165 | 8/1964 | Pegon et al. | 220/211 |
| 3,310,329 | 3/1967 | Luker | 292/256.69 |
| 4,483,458 | 11/1984 | Minning et al. | 220/320 |
| 4,722,557 | 2/1988 | Bormioli | 285/920 X |
| 5,228,825 | 7/1993 | Fruchtbaum et al. | 414/684.3 |
| 5,471,739 | 12/1995 | Fetzer | 29/705 |
| 5,570,911 | 11/1996 | Galle | 285/24 X |
| 5,707,089 | 1/1998 | Fend | 285/411 |

FOREIGN PATENT DOCUMENTS

| | | | |
|---|---|---|---|
| 23 55 779 | 5/1975 | Germany | 220/320 |
| 555912 | 9/1943 | United Kingdom | 220/592 |

*Primary Examiner*—Lynne A. Reichard
*Assistant Examiner*—Greg Binda
*Attorney, Agent, or Firm*—Locke Liddell & Sapp LLP

[57] ABSTRACT

The present invention relates to an apparatus for securely fastening joints in pressure vessels, pipes, and other structures intended to isolate internal volumes from the external environment. It can join a blank cover to a pressure vessel or it can join tubular members. It may be used in any application currently utilizing standard bolted flanges. It provides a flange retaining clamp for remotely disconnecting and remotely connecting flange members disposed on a pressure vessel, in which one of the flange members is disposed on the pressure vessel and the second flange hub end is applied in a gasketed, sealing relationship thereto, in which the flange hub ends each have a outwardly extending flange hub, wherein, the clamp has at least two clamp segments which are moveable from a closed, sealing, flange member retaining position to an open, unsealed, flange member liberating position. Said clamp segments engaging the flange members holding them together in the closed, sealing position, wherein clamp segment fastening devices can remotely forcefully open and close the clamp, wherein said clamp segment fastening devices comprise a redundancy of clamp segment conjoining elements. The clamp segment fastening devices can be remotely locked and unlocked.

41 Claims, 9 Drawing Sheets

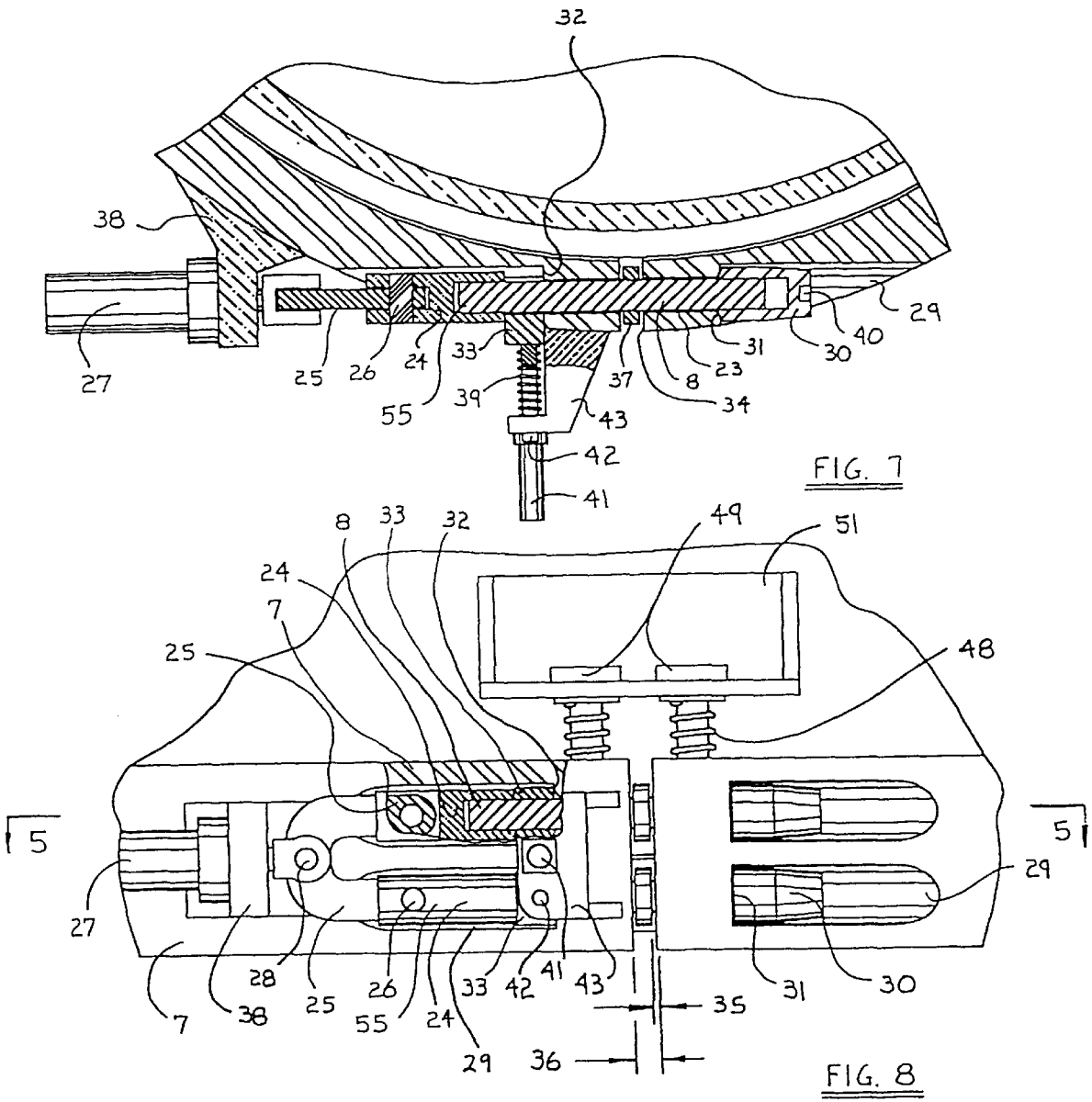

AUTOMATED FLANGE RETAINING CLAMP WITH REDUNDANT FASTENERS

RELATED APPLICATIONS

Not applicable; no related applications.

STATEMENT OF FEDERALLY FUNDED RESEARCH

Not applicable.

BACKGROUND OF THE INVENTION

1. Field of Invention

The present invention relates to a device to securely fasten joints in pressure vessels, pipes, and other structures intended to isolate internal volumes from the external environment, or in structural joints. The present invention can join a blank cover to the end of a pressure vessel or it can join tubular members having internal passages. The present invention may be used in any application currently utilizing standard bolted flanges.

Specifically, the joint connecting mechanism is a clamp that fastens flange members together in an abutting engagement creating a pressure seal in order to isolate the joints' internal environment from its external environment. Some processes require frequent and rapid opening, closing and separation of flanged joints to allow access to internal volumes. The present invention relates to a automatic joint connecting means for quickly opening and closing joints by remote actuated means to allow separation of the flanges, in situations where work persons are put at risk performing the operation.

2. Description of Prior Art

In many cases, the prior art sacrifices safety to provide a quick acting joint connecting means. The prior art illustrates single point failure mechanisms where failure of only one member could cause the integrity of the joint to be catastrophically compromised. A higher standard of safety is dictated in today's world. The present invention provides multiple fasteners thus providing more safety. There is a need in industry to be able to automatically and remotely open and close a joint, and those with ordinary skill in the art can appreciate, providing redundancy in the fastening means adds difficulty. Many companies have developed quick acting connectors, but do not provide safety. Failure of these mechanisms prompted the American Society of Mechanical Engineers (ASME) to develop rules in their Boiler and Pressure Vessel Codes that give specific rules for adding safety to "Quick Acting" devices. In order to construct a quick acting connecting means in accordance with the Codes, these rules must be observed. Single acting fastening means and single point failure devices must have secondary back-up retaining elements that will assure joint integrity upon failure of the single acting fastening means or single point failure devices. Such retaining elements will complicate automated operation.

In some installations, pressure vessels, pipes, and structural joints are opened and closed manually under conditions hazardous to the work persons performing the operation. Most prior installations utilize joint connecting means consisting of bolted flanges that are very labor intensive. The basic closing nature of bolted flanges is illustrated in the American National Standards Institute (ANSI) Publication BB16.5. Other manually operated prior art for connecting joints consist of threaded, clamped, and breach-lock mechanisms. These labor intensive designs are not well suited in hazardous environments. After observing many "Quick Acting" joint connecting means, the present inventor realized that a safe, simple, and reliable, remotely operable, "Quick Acting" connecting means did not exist, and that a substantial need therefore went unmet in the industry. Although prior art provides simplicity, it does not provide sufficient safety. In analyzing paths of failure, the prior art contains unsafe single component failure paths that upon failure would catastrophically cause the opening of the connected joint. A logical method to create a safe connecting means is to incorporate redundancy in the fastening elements and to remove all single point failure devices from the connecting means.

Supplying redundancy in a automatic connecting means can be difficult and expensive. Those skilled in the art will appreciate the benefit of the simple automatic operation of the present invention which provides safe redundant fastening elements. Of course, the system should be operable manually as well, if necessary due to a power failure or other interruption. When compared to other automated joint connecting means, it can be noted that a significant economic benefit is realized with the present invention due to its simplicity. This simplicity directly relates to lower operating costs and shorter down time. In some processes, one day of down time can result in an economic loss far surpassing the initial cost of the automated connecting means. Therefore, simplicity in design is highly valued by end users of this technology. The prior art automated joint connecting device, providing redundancy in the fastening elements contain overly complex mechanisms compared to the present invention. In the process of providing redundancy, the prior art sacrifices simplicity, reliability, and economy.

U.S. Pat. Nos. 5,336,375; 4,820,384; 5,221,019; 5,294,157; 5,228,825; 5,048,876 and 4,726,109 are mechanisms designed to remotely assist or perform connecting and disconnecting of joints in pressure vessels. One can easily observe that these devices are overly complex and will inherently be unreliable, and will also be expensive to manufacture and maintain.

Pressure and temperature of the working fluid, mechanical loads, and mechanical properties of the sealing gaskets dictate the magnitude of the axial closing force. Gaskets that are suitable for moderate to high temperatures and pressures are not generally self-energized elastomers as required in U.S. Pat. No. 4,483,458 ("the '458 patent"). The mechanism disclosed in the '458 patent cannot supply axial joint closing force since it allows clamp halves and closing elements and the pressure vessel housing to move axially relative to each other. Another result stemming from this relative movement is fatigue damage. The '458 patent device will encounter unacceptable fatigue damage in cyclic operation, requiring frequent testing, repair, or replacement. The '458 mechanism also requires external guide frames and anchor locations for automatic actuators and supports, such as foundations, that are not practical or economical. It is much simpler and safer to connect a joint with a connecting means that closes onto itself independent of external devices. The '458 mechanism also lacks positive locking fastening elements that hold the clamp halves together, where, under pressure, predictable radial and tangential forces will force the clamp halves apart. Also, this device must take on different forms depending on its orientation with respect to gravity.

U.S. Pat. Nos. 3,310,329 and 4,347,944 disclose clamp connecting devices that consist of a unity clamp band automatically actuated to liberate and secure flange members. In both of these devices, unacceptably high stresses will be generated at the midpoint of the clamp band farthest away from the separation gap in the clamp band. The stresses will alternate between very high compression to very high tension as the clamp band is cycled from the open position to the closed position. All economical materials available for construction of the clamp band will undergo unacceptable fatigue damage, which will limit the useful life of these clamp connecting devices. The clamp band of these mechanisms can be compared to a single piece of wire which is bent back and forth until severe fatigue damage separates it into two pieces.

To avoid the problem of severe fatigue damage associated with aforementioned inventions, the prior art incorporated further degrees of freedom in the clamp band. High bending stresses are alleviated by hinges that interconnect segments of the clamp band. U.S. Pat. Nos. 2,982,437 and 5,455,739 illustrate such hinged clamp band connecting means. The hinge in these mechanisms is an unacceptable single point failure location. Further, the actuating means or drive that opens and closes the clamp band, is a single point failure location. U.S. Pat. No. 3,144,165 is another example of a single point failure mechanism. Such single point failure mechanisms are unsafe.

ASME Boiler and Pressure Vessel Codes give rules for the minimum acceptable safe construction of pressure retaining components. Prior automated clamp connecting means are unsafe and are not ASME Code compliant. Accordingly, there remains a need for an automated joint connecting means suitable for normal and extreme service that is simple, reliable, rugged, and above all, safe.

SUMMARY OF THE INVENTION

In the initial stages of development, the inventor developed goals and guidelines that are now evident in the present invention. The goal was to develop a joint connecting means embodying: safety, a means to provide a uniform sealing force to isolate internal volumes from the external environment, remotely actuated primary operation, secondary manual operation, manual operation simply married with remotely actuated operation, predictable operation using simple parts and a small number of parts, cost effective design, design that does not require configuration changes based on its orientation with respect to gravity.

A novel joint connecting device is disclosed herein, incorporating a segmented outer clamp energized via remotely actuated redundant fasteners which engage flange members, tightly retaining them, creating a fluid-tight seal between the flange members. The device further embodies:

redundant clamp segment conjoining elements and no single point failure paths, remotely actuated redundant fasteners that may be remotely energized, closed, locked and which can be remotely reopened after being remotely unlocked, remotely actuated redundant fasteners that may be remotely actuated to positively lock stored energy tending to maintain the joint's seal integrity independent of the remote actuating means, remotely actuated redundant fasteners with provision for manually increasing the stored energy once locked, positive locking means to hold the joint tightly closed and which do not use friction, hydraulic, or pneumatic forces to maintain the joint's seal integrity, an easily recognized visual indication of closure, and the ability to operate effectively in extreme environments.

A standard multiple bolted flange, described in ANSI B16.5, together with the present invention, produces an axial joint closing force necessary to sustain joint sealing integrity. The present invention is designed to supply the closing force with magnitude large enough to produce a contact stress on a gasket that creates a sealing barrier between the joint's internal and external environments.

In a preferred embodiment, the present invention's flange retaining clamp includes a clamp whose perimeter is divided into a plurality of segments, joined by redundant segment fasteners. In the preferred embodiment, the clamp perimeter is substantially cylindrical, but is not limited to a cylindrical profile. For example, joints may be rectangular or another known shape. The joint can be opened and closed remotely or manually. A preferred embodiment involves remotely operable clamp segments, operable from a location separated by distance from the joint.

The nature of the present invention provides primary remote operation without compromising secondary manual operation. Those skilled in the art will appreciate the self-contained nature of the fasteners, which allow the flange retaining clamp to be manually opened and closed quickly, with only the use of a standard wrench. A novel significance of the present invention's flange retaining clamp is its ease in transition and functioning from manual to automatic remote operation.

The invention includes a remotely operated actuating means which provides a connecting force to a redundant plurality of fasteners. In a preferred embodiment of the invention, the fasteners are threaded bolts. There are a number of other joining devices that will suffice to perform the faction of the threaded bolt fasteners. Cams, hooks, cables, spring loaded locking tabs, linkages, gear driven members, rack and pinion members, chain linkages and other known devices could act as a fastener to move the clamp segments into closed, sealing position. Energizing the redundant fasteners causes the clamp's perimeter to expand and contract in an opening and closing motion, liberating or retaining the flange members. When the perimeter of the clamp segments is increased, the female taper internal diameter of the clamp segments disengages the tapered male outer perimeter of the flange hubs. The male to female tapered interface between the flange hubs and the clamp segments allows the clamp segments to act as a restraint to effectively energize and lock the flange members together allowing a seal barrier to be created. Further, the tapered flange hubs can create an axially compressing force that tends to drive the flange members into one another when the clamp is closed against the hubs. This closing occurs when the diameter of the clamp is contracted by the plurality of clamp segment fastening means. Therefore, gaskets requiring joint contact surface compression and/or seating force can be energized between the flange members creating a seal barrier to seal the vessel's internal environment from its external environment. Stored energy in the clamp segment fastening device secures a leak tight joint.

A preferred embodiment of the present invention's clamp provides a remotely operable mechanism to assure uniform closing force along the entire perimeter of the clamp segment to the flange member contact surface interface. This novel feature incorporates a slightly noncylindrical clamp segment perimeter, making controlled contact with a substantially cylindrical flange member. This feature utilizes guide members, adapted to act on the clamp segments to guide the contact of the clamp segments with respect to the flange members. The controlled contact, together with slightly noncylindrical clamp segment perimeter uniformly preloads the entire joint by initiating contact between the clamp segments and the flange members at the point farthest away from the clamp segment fasteners. The actuating device member, acting on the clamp segment fastening device, provides a closing force, transmitted into the clamp segments, reducing the clamp's perimeter and causing the clamp segments to resiliently flex substantially near or about the clamp segments' midpoint. This resilient flexing occurs as the slightly noncylindrical clamp segments are energized and forced into a substantially cylindrical form by the clamp segment fastening devices, thereby the clamp segments will have substantially coincidental radii with the flange members. The closing force first provides connecting preload at or near the clamp segments' midpoint, then continuously provides the preload force closer and closer to the clamp segment fastening device as the clamp segment is flexed about the clamp midpoint. This novel feature causes the clamp segment fastening device's force to be uniformly distributed along each entire clamp segment against the flange hubs' contact surface. The uniform preload at the contact surface, in turn, supplies a uniform sealing force on the flange member to gasket member contact surface, creating a barrier between the joints' internal and external environments.

Moreover, a novel means is utilized to assure the uniform preloading means can be effectively incorporated with a remotely operated joint opening and closing means. A preferred embodiment utilizes guide pins, attached to the clamp segments. These guide pins are restricted to travel in passageways fixed with respect to at least one flange members. The fixed motion of the guide pins, in turn, guides the radial motion of the clamp segments, relative to the flange members. This motion causes the clamp segments' midpoint to return to the flange members at a predictably controlled location every time the clamp segments are remotely actuated from the clamp segments' open position to the clamp segments' closed position.

When the clamp segments are secured to the flange members, friction between the flange hubs and the clamp segments tend to lock the clamp segments onto the flange members. In a preferred embodiment of the present invention the clamp segments have a slightly noncylindrical perimeter as compared to the flange members' substantially cylindrical perimeter, wherein the chord distance of the noncylindrical clamp segments' arc is larger than the chord distance of a corresponding substantially cylindrical clamp segment. Therefore, a further novelty is apparent because the noncylindrical clamp segments are resilient when energized and forcefully flexed into substantially cylindrical form, thus when the clamp segments become unenergized, stored energy in the clamp segments causes the clamp segments to seek their noncylindrical free state form away from the substantially cylindrical flange members, thereby producing a relative unlocking force between the clamp segments away from the flange members that overcomes the friction force holding them together. Those of ordinary skill in the art will appreciate the substantial benefit of this point of novelty, which reliably overcomes the locking friction force between the clamp segments and the flange hubs, and the importance of this novelty to the effective connecting and disconnecting of a joint.

In cylindrical geometry, clamps retaining flange members with an internal diameter less than 36 inches will preferably have two clamp segments. Larger diameter flange members will preferably be retained by clamps having several segments. Each clamp segment adapted for and conjoined by clamp segment fastening devices that are, in turn adapted for remote and/or manual actuation.

In some remotely operable connecting applications, such as joints in a coke drum, the low number of cycles (measured by half days), coupled with low contact stress at the clamp segment to flange hub interface, makes wear of this interface an insignificant factor when determining the life of the coke drum. Those skilled in the art will appreciate a novelty of the present invention's flange retaining clamp that reduces such wear at the mating surfaces between the flange hubs and the clamp segments. This point of novelty addresses the reduction of wear by decreasing the length of dynamic engagement at the mating surfaces, coupled with a reduction in contact stress at the mating surface engagement. This novelty is not apparent in prior remotely operable art. As the clamp segments engage the flange members, the novelty is apparent in the present inventions' connecting behavior. Slightly noncylindrical clamp segments mating with substantially cylindrical flange members, create a novel contacting interface for a remotely controlled flange retaining clamp.

In the closed position of the present invention's clamp, the flange hubs have a generally male conical profile that mates with the clamp segments' generally female conical profile, sharing the same conical vertex. Sharing the same conical vertex determines the overlaying of the mating surface throughout a substantial part of the 360 degree conical contact length, wherein the available mating contact surfaces of the clamp segments' come in contact with mating flange hubs' surface. In the prior art, wear was of concern when the clamp segments are dynamically moved onto the flange hubs from the open position to the closed position. Such wear is not observed in the current invention due to the foregoing novel feature.

The present invention's flange retaining clamp discounts wear with its novel contacting behavior. Slightly noncylindrical clamp segments mating with substantially cylindrical flange members, in effect, significantly align the free state conical vertex of the clamp and flange hubs' conical contact interface, wherein the flange members are retained but energized by the clamp. This close alignment significantly reduces the length of dynamic engagement between the clamp segments and flange hubs as compared to substantially cylindrical mating members, and turns the initial line contact, associated with substantially cylindrical mating members, into a large area contact. These two effects eliminate wear of the clamp segment to flange hub contact surface as the clamp segments are forced onto the flange hubs driving the flange hubs' conical apex and clamp segments conical apex into substantially alignment as the clamp closes and the gasket is sealingly compressed by the flange members. The present invention's flange retaining clamp is a novel self-contained mechanism. To function properly, the present invention's clamp does not require external devices such as foundation reaction points or motion limiting devices.

Although not shown in the drawings, the clamp segments can be further self-contained by incorporating the passageways for the pivot pins, and other clamp support passageways, into a self-containing support ring or plate, which is spring loaded to the clamp segments at the guide pins' locations. Such a self-containing ring fixes the orientation of the passageways, such that the clamp segments are guided from the open position to the closed position, relative to the flange members, and relative to each other, to assure proper connection and disconnection of the joint. This self-contained clamp assembly could then be removed as a single unit from the flange members quickly and easily for preventative maintenance. This novel approach is especially useful in a subsea environment, where remote controlled vehicles could retrieve the clamp assembly to the surface and replace the assembly with a new assembly, leaving flange members at their subsea location.

The clamp segment fastening device 55 is the entire device used both to connect together and to actuate the clamp segments 7, hold division of the clamp segments ("gap 36") securely closed, and can be of any known construction. For safety reasons the clamp segment fastening device should be redundant, and therefore not contain a failure path that could cause opening of gap 36 upon failure of any one component. There are a number of other clamp segment fastening devices that would suffice to perform the function of the clamp segment fastening device 55. Cams, hooks, cables, spring loaded locking tabs, linkages, gear driven members, rack and pinion members, chain linkages, swing bolts, and other known devices could act as a clamp segment fastening device to bring together the clamp segments 7. Although the present inventor realizes that there are a number of clamp segment fastening devices available, the current novel clamp segment fastening devices were selected because of their many benefits. These benefits are listed below.

In prior art, the transition between remote and manual operation is complicated. Some remotely operated mechanisms must be disconnected before manual operation can occur. The manual operation of prior art is both labor intensive and complicated by the remote operation. The current clamp segment fastening device can be energized to either open the clamp gap 36 or close and lock clamp gap 36 both automatically by remotely actuable drive member or by manual operation with ease and without disconnecting any components. Primary remote operation is married with secondary manual operation in a novel and simply manner. Those skilled in the art will realize the ease in transition between remote and manual operation and the ease of the manual operation of the current clamp segment fastening device.

A point of novelty of the current invention is that the clamp segments can be remotely opened and then remotely closed and then remotely locked to sealingly retain flange members. Without local intervention, it can then be remotely unlocked and then remotely opened. This process could be repeated time after time even if the current invention was in space and controlled from the earth.

The energy supplied to the clamp segment fastening device by the remotely actuable drive member is positively stored by the clamp segment fastening device thus securing gaps 36 and locking the flange retaining clamp onto the flange members even if the remotely actuable drive member is disconnected. This feature is required to safely secure the sealed joint independent of the remotely actuable drive member.

A point of novelty is that the energy stored in the clamp segment fastening device can be increased manually even after it has been locked.

The fastening means can be energized by any known actuable drive member, such as, hydraulic or pneumatic cylinders or motors. Known mechanical advantage devices such as gears, wedges, linkages and cams could be incorporated with the actuable drive member.

Another point of novelty is that the clamp segment fastening device interacts with the clamp segment in a self-contained assembly. This assembly does not require external anchors or reaction structures to operate. Also, the clamp segment fastening device will self-limit the opening motion of the clamp segments; therefore, motion limiting devices are not required.

To safely conjoin and secure the clamp segments in the closed position, the clamp segment fastening device has redundant joining elements. In a preferred embodiment of the current invention, these redundant joining elements are a plurality threaded bolts. If one bolt were to fail a backup exists.

A point of novelty is that the plurality of joining elements can be energized by a single remotely actuable drive member.

The novel design of the present invention's flange retaining clamp allows for dry assembly of the component parts of the clamp. That is, no grease or other lubricant is required during assembly. Further, depending upon the material from which the components are manufactured, the present device can be utilized in environments up to 1800 F.

Thus, in broad summary, the present invention provides an a flange retaining apparatus for remotely disconnecting and remotely connecting flange members disposed on pressure vessels, pipes and the like, in which one of the flange members is disposed on the pressure vessel and the second flange member can be applied in a gasketed, sealing relationship thereto, in which each flange member has at least one outwardly extending flange hub, which includes, in combination, the following elements:

a clamp having at least two clamp segments which are moveable from a closed, sealing, flange member retaining position to an open, unsealed, flange member liberating position, and said clamp segments engaging the outwardly extending flange hubs to hold the flange members together in the closed, sealing position;

said clamp segments separated from adjacent clamp segments by a clamp segment division;

a remotely actuable clamp segment fastening device at each clamp segment division, wherein each of said clamp segment fastening devices is adapted to close the clamp from an open position and open the clamp from a closed position, wherein said clamp segment fastening devices comprise a redundancy of clamp segment conjoining elements such that the failure of any one of these clamp segment conjoining elements will not liberate and/or unsealing of the flange members;

at least one remotely actuable powered drive member adapted to energize the clamp segment fastening device, thereby providing a means to forcefully open and forcefully close the clamp;

at least one locking devices adapted to retain stored energy in each clamp segment fastening device, wherein said stored wherein said stored energy tends to pull the clamp segments together.

DESCRIPTION OF THE DRAWINGS

FIG. 5 shows the top plan view of the automated flange retaining clamp partially sectioned. For clarity, FIG. 5 has a clamp support bracket radially removed from its true position by distance 6.

FIG. 7 is an enlarged view of the partial section shown in FIG. 5 illustrating a preferred embodiment of the present invention, focusing on a preferred embodiment of the redundant clamp segment fastening device as seen along the line 5—5 of FIG. 8.

FIG. 8 is an enlarged front perspective view of that which is shown in FIGS. 6 and 7, illustrating a preferred embodiment of the present invention, focusing on a preferred embodiment of the redundant clamp segment fastening device.

FIG. 9 shows the top plan view of the automated flange retaining clamp partially sectioned. For clarity, FIG. 9 has a clamp support bracket radially removed from its true position by distance 52.

FIG. 14 shows the top plan view of the automated flange retaining clamp partially sectioned showing the use of support plates with respect to external lugs.

DETAILED DESCRIPTION OF INVENTION

Figure 1:
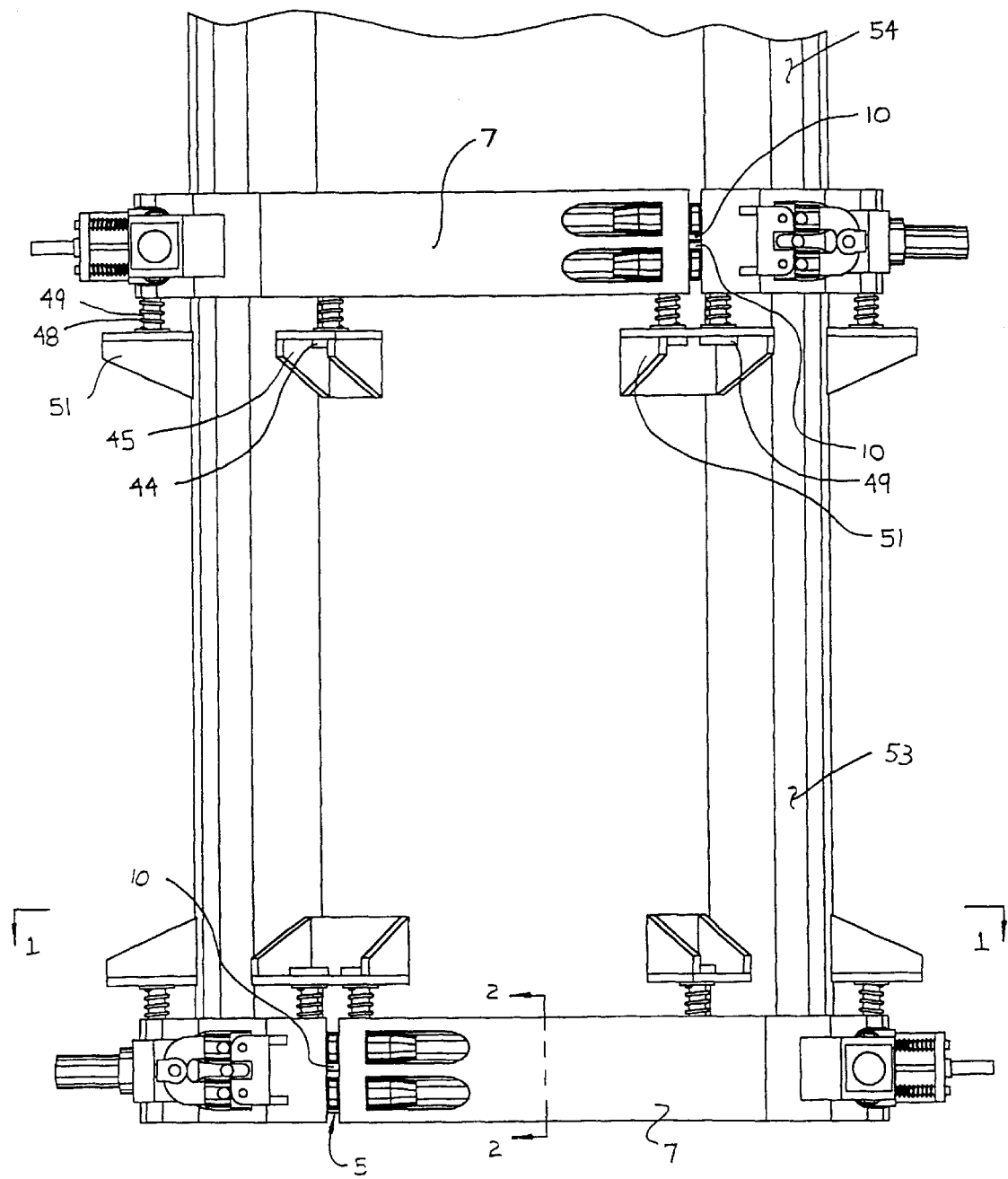
FIG. 1 is an elevation view of a vertical vessel with a preferred embodiment of the present invention having flange retaining clamps attached to a vertical vessel.

The present invention, while described herein in terms of vertically oriented vessels and openings thereto, can also secure joints in horizontal vessels, pipes, or the like, or in vessels, pipes, or the like at any orientation. FIG. 1 shows two such orientations. Referring to FIG. 1, in a first orientation (upper portion of FIG. 1), a joint between vertical vessel sections 53 and 54 is connected by a preferred embodiment of the present invention. Vessel sections 53 and 54 have flange members 10 sealingly secured by a clamp segments 7. The clamp segments 7 are supported by springs 48 on guide pins 44 and 49 which are movably attached to supports 45 and 51. Similarly, in a second orientation (lower portion of FIG. 1), a joint between the vessel section 53 and a flange member 5 is secured by a preferred embodiment of the present invention. The vessel section 53 and the flange member 5 have flange hub ends 11 and 21 sealingly secured by clamp segments 7. Clamp segments 7 are in turn supported by springs 48 on guide pins 44 and 49 which are movably attached to supports 45 and 51. The relationship between the flange members 5 and 10 and the clamp segment 7 is better shown in FIGS. 2-4. The second flange member 5 is applied in a gasketed, sealing relationship to the first flange member 10, and acts as a lid closing the internal volume of vessel section 53. Other preferred embodiments of the flange retaining clamp can connect any plausible outer perimeter joint configuration, such as, cylindrical, elliptical, parabolic, oval, or polygonal or any other perimeter having matching flange hub ends.

Figure 4:
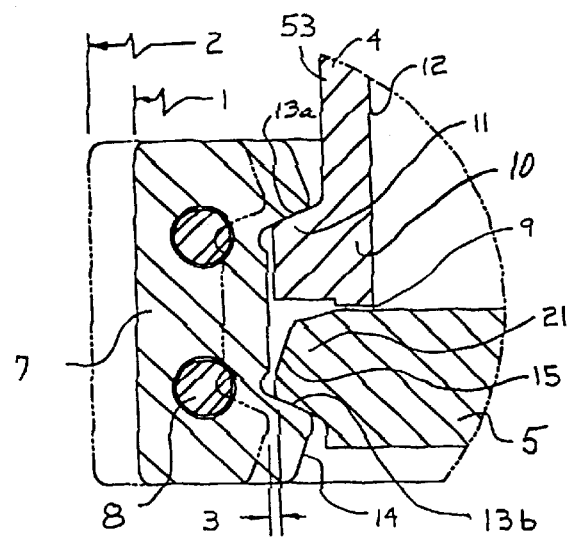
FIG. 4 is a partial section view of a preferred embodiment of the clamp segments and flange members, as seen along the line 2—2 of FIG. 1, showing bolts 8 rotated into view from their true position.

Referring to FIG. 4, shown are two flange members 5 and 10 in abutting engagement with clamp segments 7. Flange member 10 is attached to the vessel section 53 at a neck 4. The flange member 5 is the closure at the opening in the vessel section 53. FIG. 4 illustrates a vessel closing device in which two flange members 5 and 10, both having matching outer clamp-engaging surfaces and secured by the clamp segments 7, such as the joint between vessel section 53 connected to flange member 5, as shown in FIG. 1.

Flange member 10 is normally attached to the neck 4 by welding. Although not shown in FIG. 4, those skilled in the art will appreciate that the flange member 10 can be secured to the neck 4 by any number of fastening mechanisms, such as, a threaded connection. The neck 4 and the flange member 10 preferably have an internal perimeter 12 which is substantially collinear. As best shown in FIG. 4, in a preferred embodiment of the present invention, each flange member 5 and 10 has at least one radially outwardly extending flange hub 11 and 21, each having conical make-up shoulders 13a and 13b. Other embodiments of the present invention may have spherical, convex or concave make-up shoulders.

Each flange member 5 and 10 may contain a plurality of flange hub ends 11 and 21 each containing make-up shoulders 13a and 13b. The clamp segments 7 would have the same number of make-up shoulder 13a and 13b as do each flange member 5 and 10. The internal perimeter of the clamp segments 7 and the external perimeter of flange members 5 and 10 interface each other in a conical male to female fit. The make-up shoulder 13a and 13b are contact surfaces between clamp segments 7 and flange members 5 and 10. When the clamp segment conjoining elements ("bolts 8") are tightened, they force the perimeter of the clamp segments 7 to contract into flange members 5 and 10. This contraction is illustrated by the movement of clamp segments 7 from a open perimeter, shown as position 2 in FIG. 4, to a closed perimeter, shown as position 1 in FIG. 4. The conical make-up shoulders 13a and 13b transmit and multiply the force applied to bolts 8 through flange hub ends 11 and 21, driving members 5 and 10 together causing a large compressive load on the gasket 9 in a sealing relationship between the flange hub ends, which isolates the internal environment from the external environment of the vessel.

Referring to FIG. 4, in order to liberate the flange members 5 and 10 from the clamp segments 7, the clamp segments 7 are moved away from their closed position 1 to their open position 2 creating a clearance 3 that allows the outer perimeter of the flange members 5 and 10 to separate from the inner perimeter of the clamp segments 7 thus allowing the joint between vessel 53 and flange member 5 to be disassembled.

In a preferred embodiment of the present invention, the clamp segments 7 are mounted to a flange member 5 or 10.

One of the flange members to which the clamp segments 7 are mounted is generally attached to a structure, typically expected to be substantially stationary, i.e. the vessel section 53. In a preferred embodiment of the present invention, movable flange member 5 or 10 mate to the substantially stationary flange member 5 or 10. An alignment feature causes the movable flange member 5 or 10 to return to a substantially collinear relationships with respect to the substantially stationary flange member 5 or 10, so clamp segments 7, when closed, can sealingly secure the mating flange members 5 and 10 or the mating flange-members 10 and 10. The internal perimeter of the clamp segments 7 has a receiving taper 14 that interfaces with the outer perimeter of the movable flange member 5 or 10 along a taper 15, creating a means to accommodate gross misalignment during initial alignment of the flange members. Interaction between the taper 15 and the taper 14 will force the movable flange member 5 or 10 into a more collinear relationship with respect to the substantially stationary flange member 5 or 10.

Figure 2:
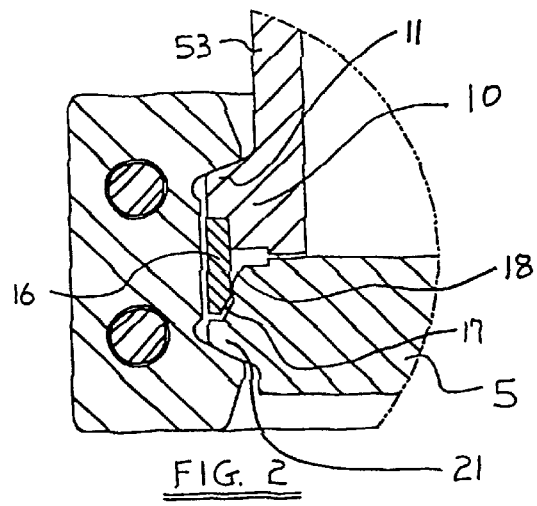
FIG. 2 is a partial section view similar to FIG. 4, illustrating an embodiment of a self-aligning feature for the flange members.

Referring to FIG. 2, an embodiment of the present invention includes a fine aligning mechanism. An aligning plate 16, preferably constructed from rolled plate, is attached to the flange member 5 or 10. The aligning plate 16 has a receiving taper 17 along its inner perimeter for receiving the flange member 5. Flange member 5 will have an interfacing taper 18 that interacts with the taper 17.

Figure 3:
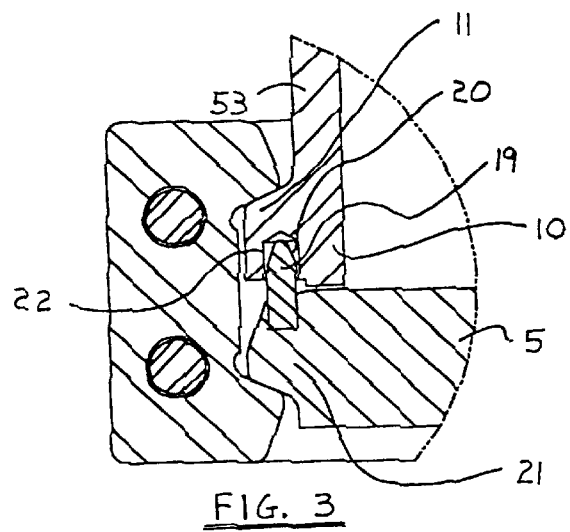
FIG. 3 is a partial section view similar to FIG. 4, illustrating an embodiment of a self-aligning feature for the flange members consisting of a plurality of box and pin members equally space around the flange members.

Referring to FIG. 3, another embodiment of a fine aligning feature consists of a box and pin type arrangement. A pin 19 has a tapered nose 20 that interfaces with box 22 to align flange member 5 to flange member 10.

Figure 5:
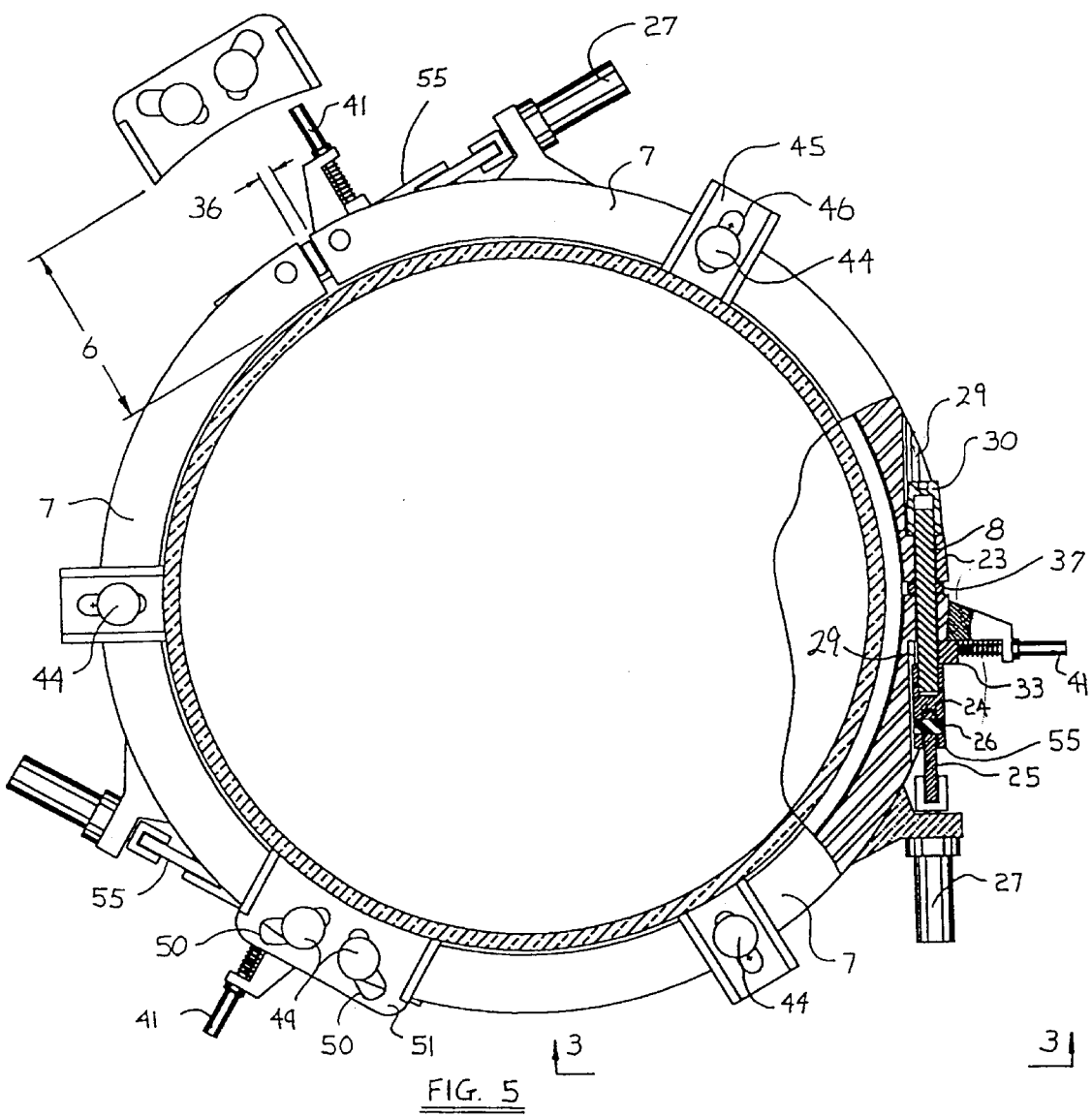
FIG. 5 is a section view of the contracted position of a preferred embodiment of the present invention as seen along the line 1—1 of FIG. 1.

Referring to FIGS. 5–8, most identifying number labels are shown in FIGS. 7 and 8 because they are enlarged partial views of FIG. 5. In a preferred embodiment of the present invention, shown in FIG. 5, the flange retaining clamp is divided into three separate clamp segments 7 at gaps 36. Each clamp segment division is defined by the gaps 36. Clamp segment fastening device 55 conjoins and interacts with the clamp segments 7 across gaps 36, controlling the magnitude of gaps 36 and securing gaps 36 such that clamp segments 7 are positively locked onto flange members 5 and 10. In a preferred embodiment of the present invention, each clamp segment fastening device 55 comprises a plurality of threaded bolts 8 with a locking nut 30, a locking device 33, a clevis nut 24, a motion limiting device 37, a yoke 25, pins 26 and 28, and a remotely actuable drive member 27. An operator at a remote control panel can activate the remotely actuable powered drive member 27 causing the clamp segment fastening device 55 to automatically drive clamp segments 7 to an expanded open position or a contracted closed and locked position, in a novel way.

In a preferred embodiment of the present invention, the flange retaining clamp is divided into a plurality of segments 7. Three clamp segments 7 are generally a preferred embodiment for large joints and two clamp segments 7 are generally acceptable for smaller joints. For cylindrical joints, two clamp segments 7 are generally used for diameters of thirty-six inches and less.

In a preferred embodiment of the present invention, a passageway 23 in the clamp segments 7 are made to accept bolts 8. As shown in FIG. 5, the passageway 23 and bolts 8 are substantially tangent to and passing through the clamp segments 7. Attached to the bolts 8 are threaded clevis nuts 24. Attached to the clevis nut 24, by a pin 26, is a yoke 25. In turn the yoke 25 is attached to a remotely actuable powered drive member 27 by a pin 28. A passageway 29, substantially collinear to the passageway 23, is made to accept the clevis nut 24, locking nut 30, and the locking device 33. Since the several locking means 24, 30, and 33 can not pass through the passageway 23, the junction of passageway 29 and 23 form reaction shoulders 31 and 32 (FIGS. 7 and 8).

Figure 6:
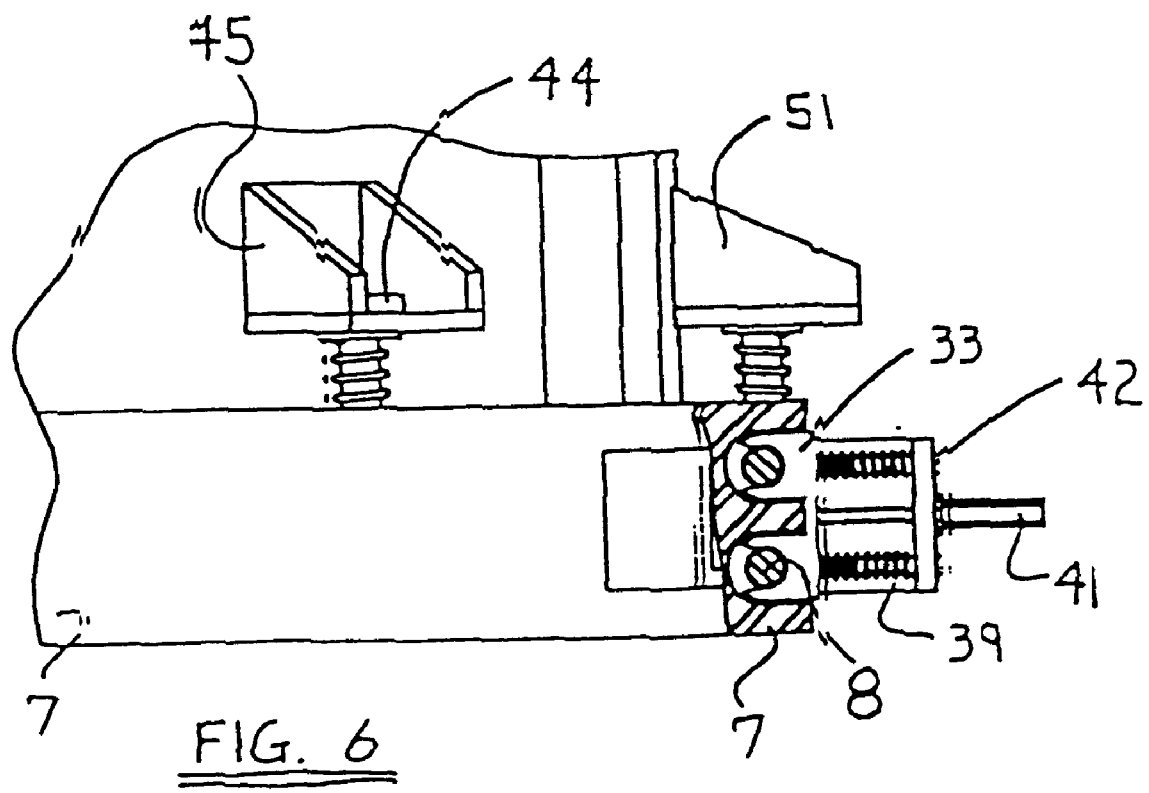
FIG. 6 is a partial side view, partially sectioned, of the automated flange retaining clamp of FIG. 5 as seen along the line 3—3 of FIG. 5. The partial section shows the relationship between bolts 8 and locking devices 33, while in the closed position.
Figure 10:
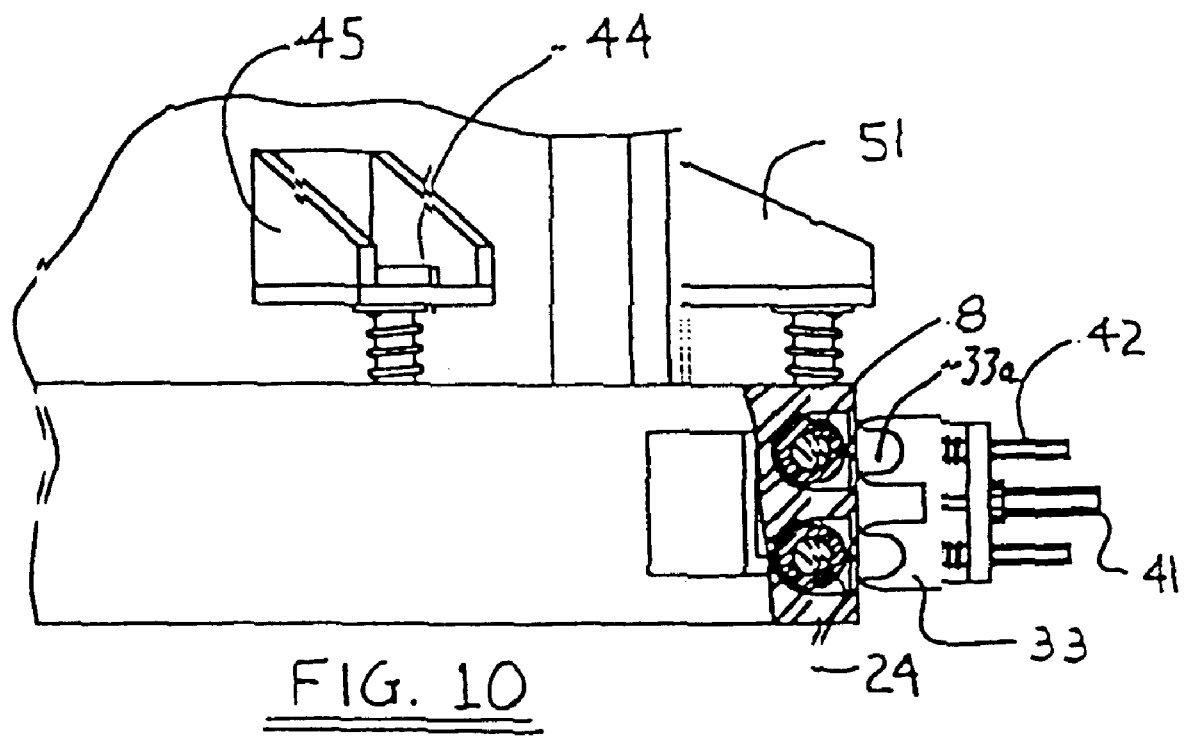
FIG. 10 is a partial side view, partially sectioned, of the automated flange retaining clamp of FIG. 9 as seen along the line 6—6 of FIG. 9. The partial section shows the relationship between fastener 8, locking device 33, and clevis nut 24, while in the open position.
Figure 11:
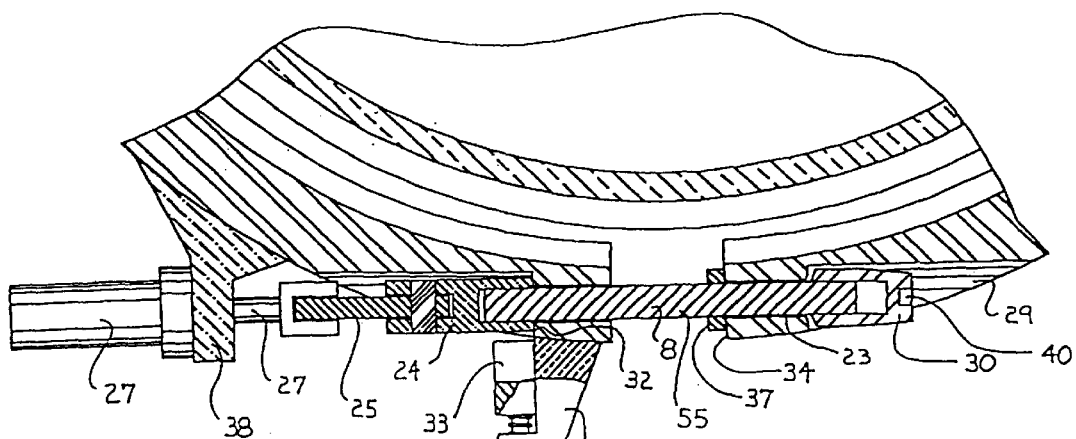
FIG. 11 is an enlarged view of the partial section shown in FIG. 9 illustrating a preferred embodiment of the present invention, focusing on a preferred embodiment of the redundant clamp segment fastening device as seen along the line 8—8 of FIG. 12.
Figure 12:
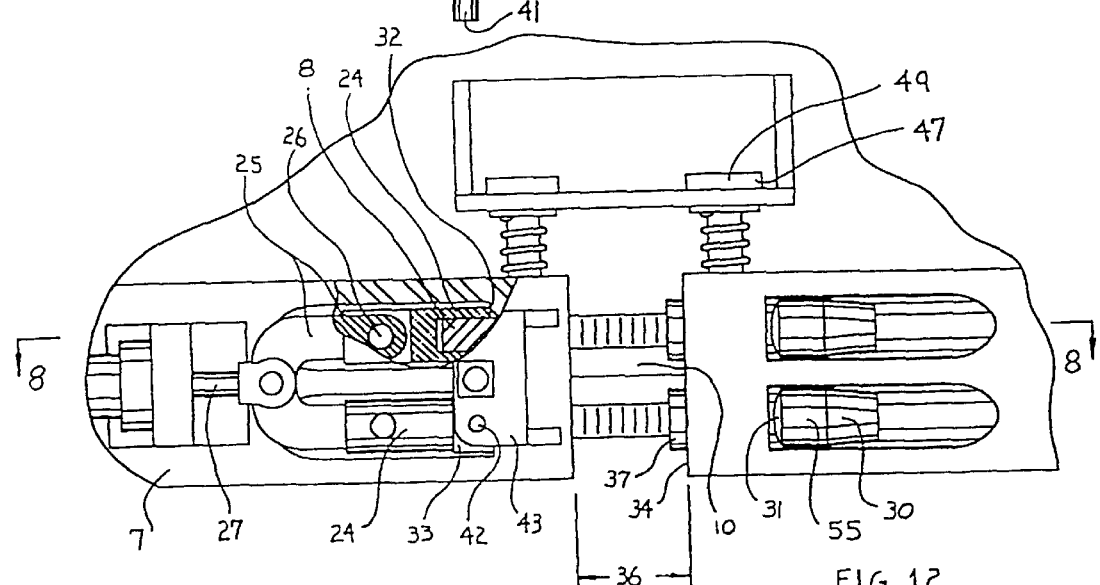
FIG. 12 is an enlarged front perspective view of that which is shown in FIGS. 10 and 11, illustrating a preferred embodiment of the present invention, focusing on a preferred embodiment of the redundant clamp segment fastening device.

To remotely close and lock the clamp segments 7 and thereby to produce an effective sealing barrier between the vessel's internal and external environment, a signal is sent from a remote control panel (not shown) that causes a power supply (not shown) to activate the remotely actuable powered drive member 27. The remotely actuable powered drive member 27 pulls yoke 25 towards anchor 38 attached to clamp segments 7. The yoke 25 evenly distributes a stretching force into bolts 8. Since the locking nut 30 cannot pass through the passageway 23, the locking nut 30 contacts the clamp segments 7 at the reaction shoulders 31, pulling the adjacent clamp segments together, thereby effectively reducing the clamp segments' perimeter. This reduction in perimeter (or circumference) forces the flange members 5 and 10, or 10 and 11 together, in turn supplying a compressive sealing force on gasket 9. Locking nut 30 and reaction shoulders 31 interface each other in a male to female spherical radii fit so as to prevent significant bending stress in bolts 8. When the remotely actuable powered drive member 27 causes a significant stretching force in the bolts 8, the bolts 8 elongate enough to allow the locking devices 33 to fit between the clevis nuts 24 and the reaction shoulders 32. The locking devices 33 have passageways 33a (FIG. 10) to allow passage of the bolts 8 but not allow passage of clevis nuts 24, thus positively locking the closing stored energy in the stretched bolts 8, and allowing isolation of the remotely actuable powered drive member 27. Since the remotely actuable powered drive member 27 is energized by a remote power source, the remotely actuable powered drive member 27 is generally not relied on to act as a continuous fastener to retain stored energy. It is beneficial to terminate the power source after energizing and locking bolts 8 with locking devices 33. As shown in FIG. 6, the locking devices 33 have "C" shaped sections, which allow the bolts 8 to fit into the opening 33a of the "C" shaped sections. At the openings in the "C" shaped sections of the locking devices 33, tapers account for misalignment of the bolts 8, the clevis nut 24, and the passageways 29 with said locking devices 33. During tightening, when sufficient clearance is achieved under the clevis nuts 24, the remotely actuable powered locking device actuator 41 advances the locking device 33 under the clevis nut 24, power to the remotely actuable powered drive member 27 can then be disconnected. The clevis nut 24 reacts on locking device 33. Since the bolts 8 were significantly stretched from their original length, they will now maintain a substantial stored energy that will secure the clamp segments 7 onto the flange members 5 and 10. Although not required, but added as safety elements, springs 39 hold locking devices 33 from moving when the remotely actuable powered locking device actuator 41 is disconnected from the power source. The springs 39 contribute to moving the locking device 33 into locking position when the remotely actuable powered drive member 27 has created sufficient clearance between the clevis nut 24 and the locking device 33. The locking device 33 is a positive locking element that locks the stored energy into clamp segment fastening device 55 without relying on friction or a power supply to maintain the stored energy. Locking devices 33 are simply ridged structural elements. A cam lock made to interface 7 & 33 could also hold locking plate 33 into closed and lock position.

Figure 14:
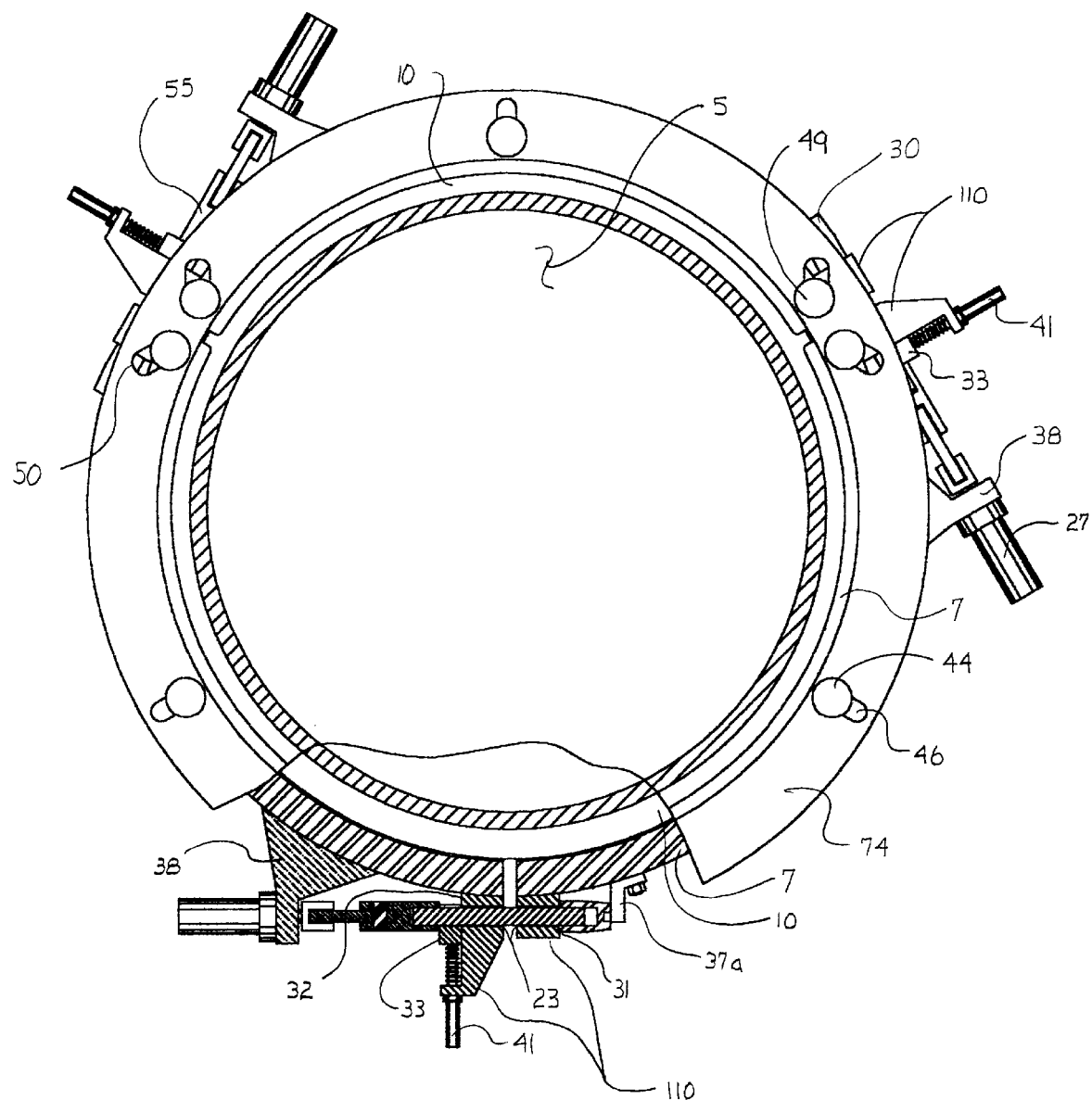
FIG. 14 is a section view of a preferred embodiment

In another embodiment, clamp segments 7 could be comprised of a segment ring with external lugs 110, wherein each external lug would contain passageways 23 and would have reaction shoulders 31 and/or 32, wherein the lugs would be located near the ends of the clamp segments farthest away from the midpoint of the clamp segment as shown in FIG. 14.

The clamp segment fastening device 55 is both remotely or manually operable without changing or disconnecting any parts of the clamp, thus, providing very quick transition between remote and manual operation. To manually close the connecting means, the user may simply tighten threaded locking nuts 30 on the bolts 8. A standard wrench interface 40 is provided to locking means 30 to allow the manual tightening of the bolts 8. Alternatively, the user may attach a portable power supply to the remotely actuable powered drive member 27. Ease in transition between remote and manual operation is a very useful feature of the present invention.

In another embodiment of the clamp segment fastening device 55, the force applied to the bolts 8 can be increased, decreased, or verified at any time without disconnection of any members simply by turning locking nut 30 with a standard wrench.

In another embodiment of the bolts 8 would be adapted for spring centralizers that would forcefully centralize the bolts 8 in passageways 23.

In another embodiment bolts 8 or passageways 23 would be adapted bearings to ease the relative motion of these components.

The two or more remotely actuable powered-drive members 27 are connected in series, so that a power source, connected to the remotely actuable powered drive member 27, supplies the same amount of power to each individual remotely actuable powered drive member 27, to assure clamp segments 7 can securely and simultaneously act to connect and disconnect the joint. The remotely actuable powered locking device actuator 41 are similarly interconnected to assure proper functioning of the locking devices 33. If required, a compressible force producing mechanism could be adapted between the clamp segments 7 assuring each gap 36 is closed substantially evenly.

Referring to FIGS. 9–13, to automatically open the clamp segments 7, a signal is sent from a control panel (not shown) removed from the clamp segments 7. The signal activates a remote power supply (not shown) to activate remotely actuable powered drive members 27 to stretch the bolts 8 until the locking devices 33 are unloaded and can be retracted by actuating the remotely actuable powered locking device actuator 41. In a preferred embodiment the motion of the locking devices 33 is predictably guided by guide members 42 that travel through passageways in anchors 43. Once the locking devices 33 are clear of the clevis nuts 24, a passageway is formed allowing the clevis nuts 24 to be moved by the remotely actuable powered drive member 27 toward reaction shoulders 32. When the remotely actuable powered drive member 27 advances the bolts 8 through the passages 23, the gap 35 (FIG. 8) becomes nil. A motion limiting means 37, attached to the bolts 8, makes contact with the clamp segments 7 at a contact surface 34. The motion forces the clamp segments to move apart expanding the parameter of the clamp segments 7 until the clevis nuts 24 makes contact with the reaction shoulders 32. At the reaction shoulders 32, the clevis nuts 24 cannot pass through the passageways 23, limiting the expanding motion of the clamp segments 7 in a self-limiting manner.

Figure 13:
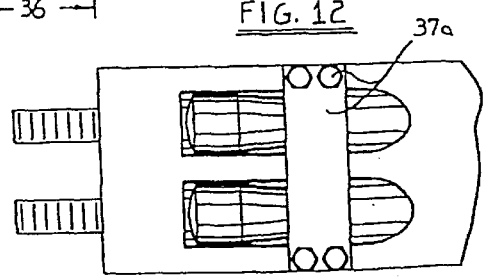
FIG. 13 is a partial side view of an alternative embodiment of the present invention that limits the motion of the clamp segment fastening device shown in FIG. 12. It is one of many possible means to perform the motion limiting function of device 37.

Thus, due to the limitations on movement of the parts comprising the clamp segment fastening device 55, the opening motion of the clamp is self-limited. Therefore, no motion monitoring devices are required. The motion limiting means 37 is adjustably attached to bolts 8. FIG. 13 shows an alternate embodiment of the motion limiting means 37, identified as 37a. The motion limiting means 37a is attached to the clamp segments 7 above the locking nut 30 and performs the same functions as the motion limiting means 37. Further, the motion limiting means 37a is designed to allow unimpeded access to a standard wrench interface 40, to allow quick manual tightening of the clamp segment fastening device 55.

To manually open the connection means, loosen threaded locking nut 30 on the bolts 8 and retract the locking device 33 by common rigging means. Extend the bolts 8 by common rigging means until clamp segments 7 are opened, as discussed in the previous paragraph. A portable power supply may be used to move the remotely actuable powered drive member 27 and the remotely actuable powered locking device actuator 41 to open the connection.

A preferred embodiment of the present invention has clamp segments 7 that radially expand and contract to liberate and secure the flange members 5 and 10. When the clamp segments 7 are tightly fastened they engage the flange members 5 and 10, such that the weight of the clamp segments 7 is supported by the flange members 5 and 10. When the clamp segments 7 are opened the weight of the clamp segments (7 is supported by the springs 48 and the guide pins 44 and 49 attached to the guide pin support frames 45 and 51.

Figure 9:
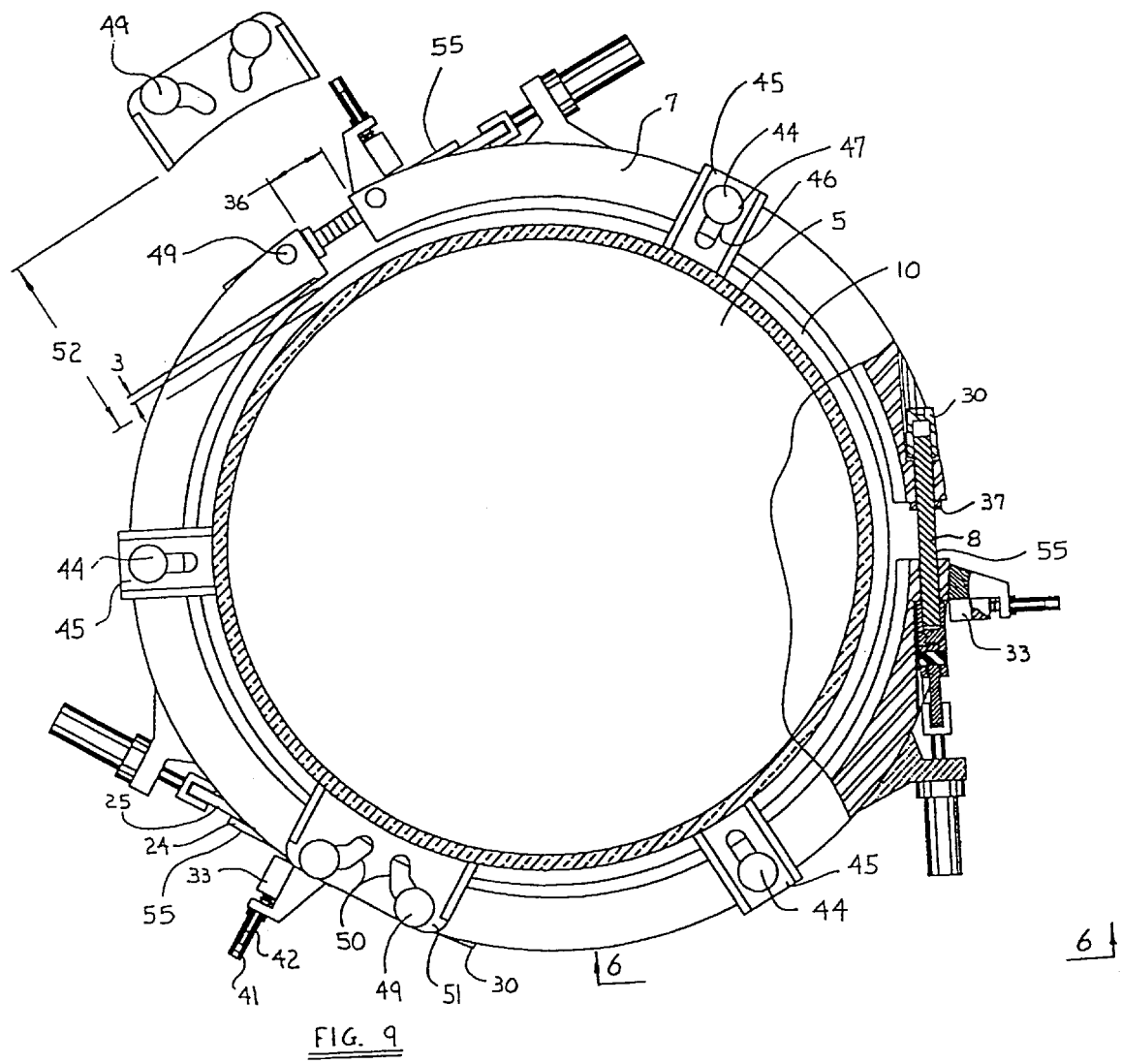
FIG. 9 illustrates the expanded position of a preferred embodiment of the present invention shown in FIG. 5.

Referring to FIGS. 1, 5 and 9, in a preferred embodiment, a guide feature controlling the relative motion of the clamp segments relative to each other and relative to the flange members, have the guide pins 44 located at the midpoint of each clamp segment, preferably evenly spaced from the clamp gaps 36 and the guide pin support frames 45 and 51 each include a passageway 46 and the guide pins 44 and 49 are attached to clamp segments 7 and are restricted to motion allowed by the passageways 46 and 50 through which the guide pins 44 and 49 travel, thus predictably controlling the motion of the clamp segments relative to each other and relative to the flange members. The guide pins 44 and 49 have shoulders 47 (FIG. 12) that have a diameter larger than the passageways 46 and 50 such that the guide pins 44 and 49 can not pass fully through the guide pin support frames. Since the guide pins 44 and 49 are attached to clamp segments 7 and can not pass fully through the supports 45 and 51, the length of the guide pins 44 and 49 axially locate the clamp segments 7 a certain prescribed distance away from supports 45 and 51. This distance is maintained by the springs 48. The pins 44 and the passageways 46 in the supports 45 play an important role in aligning the segments of the clamp segments 7 to their first point of contact with the flange members 5 and 10. At the pin locations 44 and 49, the springs 48, confined between the clamp segments 7 and the supports 45 and 51, hold the position of clamp segments 7 such that the internal female tapered section of clamp segments 7 is maintained in a position for alignment of the male flange hubs of the flange members 5 and 10. Thus, the present invention provides a self-contained flange retaining clamp, which may be operated on any orientation with respect to gravity without modification.

Further, the guide pins 44 and 49, being restricted to travel in passageways 46 and 50, control the movement of the clamp segments 7, both relative to each other and relative to the flange members 5 and 10.

The function of the guide pins 44 and 49, and the supports, 45 and 50 could be replaced by guide rods attached to the stationary neck 4 passing through or by the clamp segments 7 or by guide rods attached to the clamp segments 7 and restricted to motion in a slot attached to the neck 4. Any plausible construction could replace the function of the guide pins 44 and 49 and the passageways 46 and 50.

The guide passageways 46 and 50 may be part of a support plate rather than in separate support frames 45 and 51 as shown in FIG. 14. Such support plate 74 is then mounted to one of the flange members 5 or 10 without modification to the flange members 5 or 10. This would add to the self-containing novelty previously discussed in this disclosure. The pins 44 and 49, the springs 48 and a support plate containing passageways 46 and 50, and thereby the clamp segments 7, the clamp segment fastening devices 55, the remotely actuable powered drive members 27, the locking devices 33 and the remotely actuable powered locking devices actuators 41 would all be functionally assembled in a self-contained portable package, which could then be mounted or fixedly attached to flange members 5 or 10.

In a first embodiment of the present invention, flange members 5 and 10 and clamp segments 7 have a substantially cylindrical perimeter. In another embodiment of the present invention, flange members 5 and 10 have a substantially cylindrical perimeter while the clamp segments 7 have slightly noncylindrical perimeters with respect to flange members 5 and 10, where the arc of the clamp segments 7 has a chord distance larger that the corresponding substantially cylindrical clamp segments 7. Thus, the slightly noncylindrical clamp segments 7 will be predisposed to separate from flange members 5 and 10 at gaps 36 when unenergized by clamp segment fastening device 55. Clamp segment fastening device 55 forcibly and elastically flexes the two ends of the clamp segment 7 into substantially cylindrical form when close.

In this embodiment, where the perimeters of the clamp segments 7 can be made slightly noncylindrical with respect to the perimeters of the flange members 5 and 10, the gaps 3, one of which is shown in FIG. 9, quickly become significant at the ends of each clamp segment 7, as the clamp segments 7 are opened as fastening means 55 is loosened. When the clamp segments 7 are loosened, the end segments of the clamp segments 7 initially flex radially outwardly away from the flange members 5 and 10. Each clamp segment 7 flexes about its midpoint, farthest away from gaps 36, thus causing the gaps 3 to quickly become pronounced. This motion significantly reduces the distance the clamp segments 7 are required to move away from flange members 5 and 10, as can measured by the required length of the passageways 46. Compared to the mating of substantially cylindrical clamp segments 7 to substantially cylindrical flange members 5 and 10, the foregoing noncylindrical clamp segment embodiments of the present invention substantially reduce the distance the clamp segments 7 must move to open. Conical apexes of the conical contact surfaces 13 of slightly noncylindrical clamp segments 7 mating with substantially cylindrically flanged members 5 and 10 are effectively close in the open position allowing the open position gaps 36 to be much smaller. Also, the initial contact area between the clamp segments 7 and flange members 5 and 10 is significantly greater than in the corresponding substantially cylindrical mating components. Smaller open position gaps 36 result in cost saving because the components of the clamp segment fastening device 55 can be much shorter. The open perimeter of the clamp segments 7 is much smaller, saving space. Also frictional forces holding the clamp segments 7 onto the flange members 5 and 10 are partially overcome by the outwardly flexing action of the slightly noncylindrical clamp segments 7 away from the flange members 5 and 10 when initially opened.

In the noncylindrical embodiment of the present invention, the slightly outwardly noncylindrical clamp segments 7 connecting to the substantially cylindrical members 5 and 10 eliminates wear at the contact surfaces 13. When the slightly noncylindrical clamp segments 7 are moved on and off the flange members 5 and 10, the contact stress on the surfaces 13 is significantly lowered because the contact area between the clamp segments 7 and flange members 5 and 10 is greatly increased, as compared to substantially cylindrical mating components 7, 5, and 10.

Since the noncylindrical clamp segments 7 must be resiliently flexed into substantially cylindrical form to close onto substantially cylindrical flange members 5 and 10, there exists a gap closing resistance force at gaps 36, thereby assuring the remotely actuable powered drive members 27 associated with the clamp segment fastening devices 55 to actuated to move the clamp segments 7 substantially simultaneously.

Having described the invention above, various modifications of the techniques, procedures, material and equipment will be apparent to those in the art. It is intended that all such variations within the scope and spirit of the appended claims be embraced thereby.

I claim:

1. An apparatus for remotely disconnecting and remotely connecting flange members, in which a first flange member is disposed on a pressure vessel and a second flange member is adapted to be applied in a gasketed, sealing relationship thereto, in which each flange member has at least one outwardly extending flange hub, comprising in combination:

a clamp having at least two clamp segments which are moveable from a closed, sealing, flange member retaining position to an open, unsealed, flange member liberating position, said clamp segments engaging the outwardly extending flange hubs to hold the flange members together in the closed, sealing position;

said clamp segments separated from adjacent clamp segments by a clamp segment division;

a remotely actuable clamp segment fastening device disposed at each clamp segment division, wherein each of said clamp segment fastening devices is adapted to close the clamp from said open position and to open the clamp from said closed position, wherein said clam p segment fastening devices comprise:

a plurality of redundant clamp segment conjoining elements such that the failure of any one of said clamp segment conjoining elements will not result in unsealing of the flange members;

at least one remotely actuable powered drive member adapted to energize the clamp segment fastening device, to forcefully open and forcefully close the clamp;

at least one locking device adapted to retain stored energy in each clamp segment fastening device, wherein said stored energy tends to pull the clamp segments together.

2. An apparatus as in claim 1, wherein the clamp segments are substantially cylindrical.

3. The apparatus of claim 1, wherein disposed near each clamp segment division is an external radial protruding lug adapted to interface a clamp segment fastening device.

4. The apparatus of claim 1 wherein the clamp segments and the clamp segment fastening devices are assembled in a self-contained package.

5. The apparatus of claim 1, further comprising at least one locking member positively securing a gap existing between clamp segments.

6. The apparatus of claim 5 whereby the locking member secures the gap without powered input.

7. The apparatus of claim 1, wherein the at least one outwardly extending flange hub has a substantially conical surface.

8. The apparatus of claim 7, wherein the substantially conical surface reduces the axial thickness of the flange hub in the radially outward direction.

9. An apparatus for remotely disconnecting and remotely connecting substantially cylindrical flange members, in which a first flange member is disposed on a pressure vessel and a second flange member is adapted to be applied in a gasketed, sealing relationship thereto, in which each flange member has at least one radially outwardly extending flange hub, comprising in combination:

a clamp having at least two arced slightly noncylindrical clamp segments, wherein the chord distance of said slightly noncylindrical clamp segments is larger than the chord distance of a corresponding substantially cylindrical clamp segment, and said clamp segments are moveable from a closed, sealing, flange member retaining position to an open, unsealed, flange member liberating position, said clamp segments engaging the radially outwardly extending flange hubs to hold the flange members together in the closed, sealing position;

said slightly noncylindrical clamp segments separated from adjacent clamp segments by a clamp segment division;

a remotely actuable clamp segment fastening device disposed at each clamp segment division, wherein each of said clamp segment fastening devices is adapted to close the clamp from said open position and open the clamp from said closed position, wherein said clamp segment fastening devices comprise:

a plurality of redundant clamp segment conjoining elements such that the failure of any one of these clamp segment conjoining elements will not result in unsealing of the flange members;

at least one remotely actuable powered drive member adapted to energize the clamp segment fastening device, to forcefully open and forcefully close the clamp;

wherein said slightly noncylindrical segments are resiliently flexed into substantially cylindrical form when energized by the clamp segment fastening devices, thereby having substantially coincidental radii with said flange members along the contact surface between said clamp segment and said radially outwardly extending flange hubs, when energized and said clamp segments resiliently return to said noncylindrical form when unenergized;

at least one locking device adapted to retain stored energy in each clamp segment fastening device, wherein said stored energy tends to pull the clamp segments together.

10. An apparatus as in claim 1 or claim 9, wherein the clamp segments contact the flange hubs at a conical surface contact interface.

11. An apparatus as in claim 1 or claim 9, further comprising a guide adapted to control the motion of the clamp segments relative to each other as said clamp segments are moved from their open position to their closed position or from their closed position to their open position.

12. An apparatus as in claim 1 or claim 9, further comprising a guide feature adapted to control the motion of the clamp segments relative to the flange members as said clamp segments are moved from their open position to their closed position or from their closed position to their open position.

13. An apparatus as in claim 1 or claim 9, adapted for manual operation concomitantly with remote controlled operation.

14. An apparatus as in claim 1 or claim 9, wherein the stored energy in the clamp segment fastening device can be adjusted manually to increase or decrease said stored energy, even when said clamp segment fastening device is locked.

15. An apparatus as in claim 1 or claim 9, wherein the first and second flange members both comprise internal passageways that comprise the internal volume of a pressure vessel, pipe or the like.

16. An apparatus as in claim 1 or claim 9, wherein the second flange member is part of an end plate for closing a pressure vessel, pipe or the like.

17. An apparatus as in claim 1 or claim 9, wherein the second flange hub end is removable and replaceable either manually or remotely after being liberated by the clamp.

18. An apparatus as in claim 1 or claim 9, wherein the pressure vessel is a coke drum.

19. An apparatus as in claim 1 or claim 9, wherein the second flange hub end is removable and replaceable either manually or remotely after being liberated by the clamp, wherein the pressure vessel is a coke drum.

20. An apparatus as in claim 1 or claim 9, wherein the flange members comprise aligning members to axially align the first flange member with the second flange member.

21. An apparatus as in claim 1 or claim 9, wherein the clamp and second flange member comprise gross aligning features to axially align the second flange member with the opened clamp.

22. An apparatus as in claim 1 or claim 9, wherein the flange members comprise aligning members to axially align the first flange member with the second flange member, wherein the clamp and second flange member comprise gross aligning features to axially align the second flange member with the opened clamp.

23. An apparatus as in claim 1 or claim 9, wherein the flange members comprise aligning members to axially align the first flange member with the second flange member, wherein the clamp and second flange member comprise gross aligning features to axially align the second flange member with the opened clamp, wherein the pressure vessel is a coke drum.

24. An apparatus as in claim 1 or claim 9, wherein ail of the remotely actuable powered drive members associated with the clamp segment fastening devices are actuated to move the clamp segments substantially simultaneously.

25. An apparatus as in claim 1 or claim 9, wherein the locking devices can be remotely actuated from an unlocked position to a locked position and remotely actuated from a locked position to an unlocked position, wherein each said locking device is remotely actuable by a remotely actuable powered locking device actuator.

26. An apparatus as in claim 1 or claim 9, wherein the locking devices can be remotely actuated from an unlocked position to a locked position and remotely actuated from a locked position to an unlocked position, wherein each said locking device is remotely actuable by a remotely actuable powered locking device actuator, wherein all of the remotely actuable powered locking device actuators associated with the locking devices, are actuated to move the locking devices substantially simultaneously.

27. An apparatus as in claim 1 or claim 9, wherein the locking devices can be remotely actuated from an unlocked position to a locked position and remotely actuated from a locked position to an unlocked position, wherein each said locking device is remotely actuable by a remotely actuable powered locking device actuator, wherein all of the remotely actuable powered locking device actuators associated with the locking devices are actuated to move the locking devices substantially simultaneously, wherein all of the remotely actuable powered drive members associated with the clamp segment fastening devices are actuated to move the clamp segments substantially simultaneously.

28. An apparatus as in claim 1 or claim 9, wherein the clamp is adjustably held in a position for alignment to the outwardly extending flange hubs so that the clamp segments can engage said outwardly extending flange hubs as the clamp is moved from its open position to its closed position.

29. An apparatus as in claim 1 or claim 9, wherein the flange members, sealingly retained by the closed and locked clamp, can then be unsealingly liberated by unlocking and opening the clamp; and in reverse, the flange members, unsealing liberated by the unlocked and open clamp, can then be sealing retained by closing and locking the clamp; where all of these functions can be performed remotely in a fully automatic manner without manual intervention.

30. An apparatus as in claim 9, further comprising a feature that effectively eliminates wear at the clamp segment to flange hub contact surface, wherein the slightly noncylindrical resilient clamp segments form a wear reducing contact interface with the substantially cylindrical flange members.

31. An apparatus as in claim 9, further comprising a feature that effectively reduces the required length that the clamp segments must move to liberate the flange members, thereby reducing the required length of the parts comprising the clamp segment fastening devices, and reducing the environmental area required to open the clamps, wherein the slightly noncylindrical resilient clamp segments engaging the substantially cylindrical flange members produce said feature.

32. An apparatus as in claim 9, further comprising a friction unlocking feature, wherein the slightly noncylindrical resilient clamp segments, once unenergized from a substantially cylindrical form, seek their slightly noncylindrical free state form, effectively overcoming frictional forces tending to hold the clamp segments and flange members together after the clamp has been forcefully closed onto the flange hubs.

33. An apparatus as in claim 9, further comprising a uniform force feature, wherein the slightly noncylindrical resilient clamp segments engaging the substantially cylindrical flange members produces a substantially uniform closing sealing force along the entire clamp segment to the flange hub contact surface interface.

34. An apparatus as in claim 9, further comprising a substantially simultaneous actuation feature, wherein, the slightly noncylindrical clamp segments must be resiliently flexed into substantially cylindrical form to close onto substantially cylindrical flange members, thereby there exists a closing resistance force at the gaps between the clamp segments, thereby assuring the remotely actuable powered drive members associated with the clamp segment fastening devices will actuated to move the clamp segments substantially simultaneously.

35. An apparatus as in claim 9, further comprising a substantially simultaneous actuation feature, wherein, the slightly noncylindrical clamp segments must be resiliently flexed into substantially cylindrical form to close onto substantially cylindrical flange members, thereby there exists a closing resistance force at the gaps between the clamp segments, thereby assuring the remotely actuable powered drive members associated with the clamp segment fastening devices will actuated to move the clamp segments substantially simultaneously, further comprising a remotely actuable method for moving the second flange member, where all of these functions can be performed remotely in a fully automatic manner without manual intervention.

36. The apparatus of claim 9, wherein disposed near each clamp segment division is an external radial protruding lug adapted to interface a clamp segment fastening device.

37. The apparatus of claim 9 wherein the clamp segments and the clamp segment fastening devices are assembled in a self-contained package.

38. The apparatus of claim 9, further comprising at least one locking member positively securing a gap existing between clamp segments.

39. The apparatus of claim 38 whereby the locking member secures the gap without powered input.

40. The apparatus of claim 9, wherein the at least one outwardly extending flange hub has a substantially conical surface.

41. The apparatus of claim 40 wherein the substantially conical surface reduces the axial thickness of the flange hub in the radially outward direction.

* * * * *

UNITED STATES PATENT AND TRADEMARK OFFICE
CERTIFICATE OF CORRECTION

PATENT NO : 5,908,210
DATED : June 1, 1999
INVENTOR(S): Kelly Fetzer

It is certified that error appears in the above-identified patent and that said Letters Patent is hereby corrected as shown below:

Column 16, Line 46, of Claim 1, the word "clam" and the letter "p" should be connected to read "clamp."

Column 17, Line 6, of Claim 7, after the word "wherein" delete the word "the."

Column 20, Line 14, of Claim 34, after the word "will" insert the word "be."

Column 20, Line 24, of Claim 35, after the word "will" insert the word "be."

Column 20, Line 41, of Claim 40, after the word "wherein" delete the word "the."

Signed and Sealed this

Eleventh Day of January, 2000

Attest:

Attesting Officer

Q. TODD DICKINSON

Acting Commissioner of Patents and Trademarks